3,246,542
TRANSMISSION
Richard D. Moan, Dearborn, Mich., assignor to Ford Motor Company, Dearborn, Mich., a corporation of Delaware
Filed Sept. 19, 1962, Ser. No. 224,716
14 Claims. (Cl. 74—740)

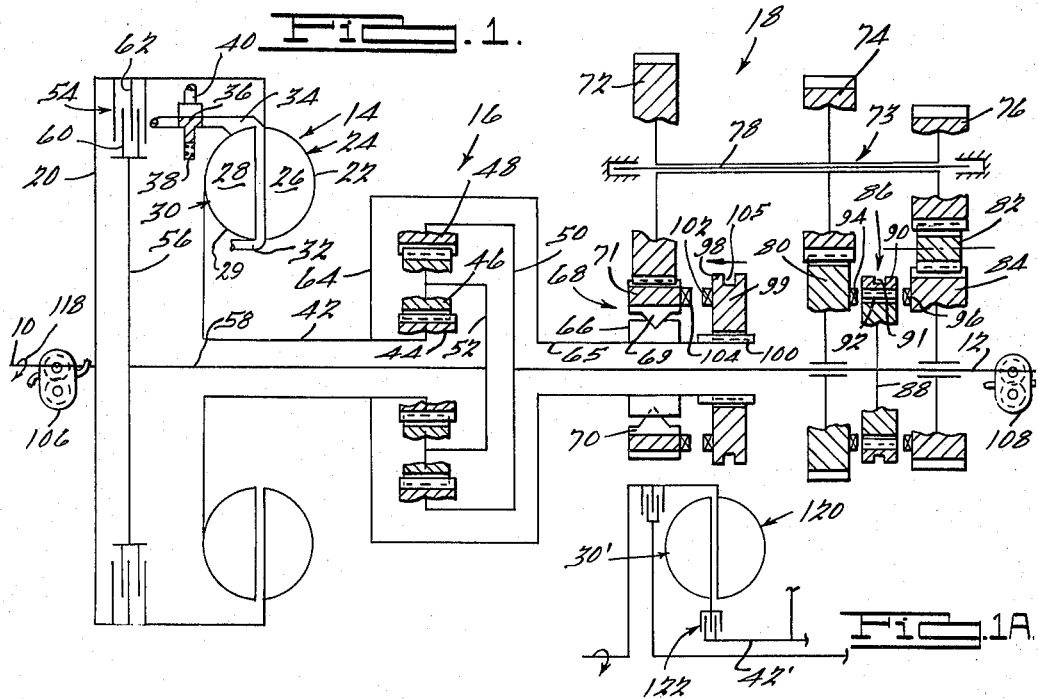

This invention relates to an automatic transmission for a motor vehicle, and more particularly to one that provides three forward speed drives, neutral, a reverse drive, and hill braking by the use of a minimum number of parts and controls.

The invention provides a transmission that not only is economical to manufacture and easy to assemble and disassemble, but one that requires only the simplest of control systems to provide smooth automatic changes from one speed ratio to another.

The invention accomplishes the above objectives by combining a selectively operable fluid coupling with a planetary gear set and countershaft gearing. The gearing is controlled primarily by the use of a mechanically operating overrunning coupling and manually movable dog type couplings, eliminating the necessity of a complex control system. The service life of the transmission is therefore greatly lengthened.

Therefore, it is an object of this invention to provide a transmission that provides three forward drives, neutral, a reverse drive, and hill braking by the use of a minimum number of parts and controls, thereby rendering the transmission economical to manufacture and efficient in operation.

A further object of the invention is to provide a low cost transmission consisting of a hydrodynamic torque transmitting means combined with a plurality of gearing, and controlled to produce the various desired operative drive conditions primarily by the use of mechanical type couplings operable either automatically or manually.

It is a still further object of the invention to provide a transmission combining a controllable fluid coupling with a planetary gear set and countershaft gearing controlled by overrunning type and manually operated dog type couplings together with one or more fluid pressure operated clutches.

Other objects, features and advantages will become apparent upon reference to the succeeding detailed description of the invention, and to the drawings illustrating the preferred embodiments thereof, wherein:

FIGURE 1 is a schematic illustration of a transmission embodying the invention,

FIGURE 1A shows a modification of a portion of the transmission of FIGURE 1,

FIGURE 2 is a diagrammatic illustration of another transmission embodying the invention, and FIGURE 2A shows a modification of a portion of the transmission of FIGURE 2.

FIGURE 1 shows diagrammatically a transmission having an input shaft 10 and an output shaft 12 coupled through the agency of a fluid coupling 14, a planetary gear set 16, and a countershaft reduction gear train 18.

More specifically, the input shaft 10, which may be connected to the engine of a motor vehicle (not shown), is shown as fixed to one edge of an annular driving flange 20. The flange is connected at its opposite edge to the outer shroud 22 of the pump or impeller 24 of fluid coupling 14. The shroud supports a number of circumferentially spaced, dish-shaped blades 26, facing a similar number of circumferentially spaced and shaped turbine blades 28 secured within an annular shroud 29. The shrouds together define a chamber for the toroidal flow of fluid in a known manner to effect the transmission of torque from the impeller to the turbine.

The coupling is adapted to be filled with fluid through a supply conduit 32, and, in this instance, is of the dump and fill type. That is, it is capable of being filled and emptied of fluid to variably control the transmission of torque from the impeller to the turbine. The coupling normally discharges fluid from its outer periphery through a passage 34. The exhaust flow is controlled by a valve 36 reciprocably mounted within the passage. The valve is biased by a spring 38 to a position opening the passage, or moved to the position shown blocking flow upon the application of fluid under pressure to the top of the valve through a conduit 40.

The turbine 30 is drive connected to one end of a sleeve shaft 42 having its opposite end connected to the sun gear 44 of gear set 16. The gear set is of the simple planetary type having spaced planet pinions (generally three) 46 meshing with the sun gear and a ring gear 48. The ring gear is connected directly to the output shaft 12 by a drive connection 50. The pinions are rotatably mounted upon shafts supported in a carrier member 52.

The carrier at times is adapted to be driven by the input shaft 10, and for this purpose is connected to it by a clutch 54 and connecting drive members 56 and 58. The clutch is shown as being of the fluid pressure actuated friction disc type. It has a set of internal annular discs 60 splined or otherwise connected to drive member 56, alternating with annular discs 62 secured to the radical driving extension 20 of input shaft 10.

As thus far described, therefore, it will be seen that gear set 16 can be driven in a number of ways; that is, by filling coupling 14 and driving sun gear 44 alone; by engaging clutch 54 to drive carrier 52 along; or by simultaneously activating both coupling 14 and clutch 54.

Turbin 30, in addition to driving gear set 16, also drives the countershaft gearing 18 by means of a branch drive line 64 and a sleeve shaft 65. The sleeve shaft is nonrotatably fixed within the inner annular race 66 of an overrunning clutch 68. The clutch is of a known mechanically operating type having sprags 69 between the inner race and an outer annular race 70 to permit rotation of the outer race in one direction relative to the inner race, while preventing relative rotation in the opposite direction. Race 70 is press fitted or otherwise secured within an externally toothed gear 71.

Gear 71 meshes with a gear 72 formed as an integral part of a cluster of gears including two different diameter gears 74 and 76. The cluster is rotatably mounted upon a countershaft 78, in turn nonrotatably mounted in the transmission housing in any suitable manner. The gear 74 meshes with a gear 80 rotatably mounted upon output shaft 12, while gear 76 meshes with a reverse idler pinion 82 rotatably supported upon a shaft carried by the transmission housing. The idler pinion in turn meshes with a gear 84 also rotatably mounted upon output shaft 12.

Gears 80 and 84 are alternately and selectively connected mechanically to the output shaft 12 by a manually operated dog type coupling member 86 to provide either forward or reverse drive of shaft 12 by the reduction gearing. The coupling member is fixed to the output shaft by a drive connection 88, and has a sleeve 90 slidably splined to its outer peripheries. The sleeve is manually movable in opposite axial directions by the insertion of a shifter fork (not shown) into a groove 91. The sleeve has internal teeth 92 engaging teeth 94 formed on gear 80 in the forward drive position of the sleeve 90, and engaging teeth 96 on gear 84 in the reverse drive position of the sleeve, as will appear more clearly later.

Under certain operating conditions, such as during coast of the vehicle wherein output shaft 12 becomes the drive member, the gear member 71 would normally overrun shaft 65 permitting a runaway condition of the output shaft 12.

To prevent this, the overrunning clutch 68 is adapted to be locked up by a mechanically operated dog type clutch 98. Clutch 98 has an annular member 99 slidably splined to shaft 65. The member has clutch teeth 102 engageable with teeth 104 formed on the gear 71 when it is moved manually to the left as seen in FIGURE 1 by a shifter fork (not shown). The shifter fork is normally engaged in a groove 105 in the member. Thus, the inner and outer races are locked together thereby directly connecting shaft 65 and gear 71 for unitary rotation. The drive from shaft 12 is then transmitted back through coupling 14 to input shaft 10 to provide an engine braking effect.

Two fluid gear pumps 106 and 108 are shown connected to the input and output shafts 10 and 12 respectively, for supplying the necessary fluid under pressure for filling coupling 14 and actuating the coupling control valve 36 and friction clutch 54.

In operation, neutral is established by emptying the coupling 14, disengaging clutch 54, and moving coupling member 86 to its neutral position shown in FIGURE 1. Therefore, no drive is transmitted by the fluid coupling or clutch 54 to either of the gear sets, or to the output shaft.

First or low speed forward drive effects a drive of the output shaft by the countershaft reduction gear train alone. Accordingly, coupling member 86 is moved to connect gear 80 to shaft 12, coupling valve 36 is moved to permit filling of coupling 14 to render it operative, and clutch 54 is disengaged. Clockwise rotation of input shaft 10 in the direction of arrow 118 therefore rotates impeller 24 clockwise, rotating turbine 30 and the overrunning clutch inner race 66 clockwise. The clutch 68 locks up to drive gears 72 and 74 counterclockwise, rotating gear 80 and output shaft 12 clockwise. The output shaft will therefore be driven forwardly at a speed reduced from that of the input shaft, as determined by the reduction of the gear unit 18.

Second speed forward drive is established by emptying coupling 14 and engaging clutch 54, the drive this time being a compound drive through both gear sets to the output shaft 12. Forward or clockwise rotation of input shaft 10 therefore drives carrier 52 clockwise. While ring gear 48 is rotating because of its direct connection to shaft 12, it still acts as the reaction member for gear set 16. Therefore, sun gear 44 is overdriven clockwise maintaining overrunning clutch 68 locked up, and the drive of output shaft 12 now is at a faster speed. Output shaft 12 will also be driven by the clockwise rotation of ring gear 48 by carrier 52.

Coast or hill braking is provided in this speed range by moving clutch member 98 to lock up the overrunning clutch 68 in both directions. Thus, drive by output shaft 12 back through the transmission will drive shaft 65 and sun gear 44 to provide engine braking through the connection of carrier 52 to the input shaft.

Third speed forward or direct drive is established by simultaneously engaging clutch 54 and filling coupling 14. Clockwise rotation of input shaft 10 then drives sun gear 44 and carrier 52 at substantially the same speed thereby locking up gear set 16 to drive output shaft 12 at engine speed, gear 71 overrunning.

Reverse drive is established by moving coupling member 86 to connect shaft 12 and gear 84, moving valve 36 to fill coupling 14, and disengaging clutch 54. Clockwise rotation of input shaft 10 and impeller 24 therefore drives turbine 30 clockwise locking up overrunning clutch 68 to drive gear 84 and output shaft 12 in a reverse or counterclockwise direction. The gear set 16 at this time idles freely.

FIGURE 1A shows a modification of the transmission of FIGURE 1 wherein the fill and empty fluid coupling 14 of FIGURE 1 is replaced by the combination of a constantly filled fluid coupling 120 and a fluid pressure actuated friction clutch 122. Clutch 122 is located between the turbine 30′ and the turbine output shaft 42′ to interrupt the transmission of torque from the turbine to the sun gear 44 when desired. In all other respects, the operations of the transmissions of FIGURES 1 and 1A are the same, and the details thereof will therefore not be repeated. Suffice it to say that to establish low speed, direct drive and reverse drive, clutch 122 is engaged to provide the same connections in FIGURE 1A as is obtained by filling of the coupling 14 in FIGURE 1. To establish second speed or hill braking operations, clutch 122 is disengaged to break the drive from coupling 120 to sun gear 44.

FIGURE 2 shows another transmission embodying the invention. It consists of input and output shafts 210 and 212 drivingly interconnected by a fill and empty type fluid coupling 214, a planetary gear set 216, and countershaft gearing 218. More specifically, input shaft 210 is connected to the outer annular shroud 222 of the rotatable impeller 224 of coupling 214 by a drive flange member 226. The impeller has a plurality of circumferentially spaced blades 228 secured within the shroud and facing a similar number of turbine blades 230 secured within an annular shroud 232. The impeller and turbine blades and shrouds cooperate together to form a toroidal fluid flow circuit in the same manner as in the coupling 14 of FIGURE 1 to transmit torque from the impeller to the turbine. The coupling is filled with fluid at its inner periphery from a supply line 234. Its discharge line 236 is controlled by a valve 238 spring biased to open line 236, and moved to close the line by fluid under pressure acting on top of the valve from a signal line 239.

The turbine 233 has an output member 241 drive connected to the sun gear 242 of gear set 216 by a shaft 243. The gear set is again of the simple planetary type having planet pinions 244 meshing with sun gear 242 and a ring gear 246 directly connected to output shaft 212 by a drive connection 248. The pinions 244 are rotatably supported upon a planet carrier 250. The carrier is adapted at times to be connected to the coupling impeller 224 to be driven thereby by a fluid pressure actuated friction clutch 252 and connecting lines 254 and 256.

The carrier 250 is also directly connected to a gear 258 rotatably surrounding output shaft 12 and constituting the input drive to the countershaft gearing 218. Gear 258 engages a gear 260 formed as an integral part of a cluster of gears rotatably mounted upon a countershaft 262. The countershaft has its ends fixedly secured within the transmission housing. The cluster includes a gear 264 spaced from gear 260 and meshing with a gear 266. Gear 266 surrounds and has fixed within it the outer annular race 268 of a mechanical overrunning device 270.

The device may be of substantially the same construction as clutch 68 in FIGURE 1. It has an inner race 272 separated from race 268 by rollers or sprags 274 permitting rotation of inner race 272 in a clockwise direction relative to outer race 268, but preventing counterclockwise relative rotation. Inner race 272 is secured to one end of a sleeve shaft 276 surrounding output shaft 212, and is connected to the output shaft by means of a mechanical dog clutch 280 slidably splined on shaft 212. The dog clutch has teeth 282 extending axially therefrom for engagement with teeth 284 formed on the inner race 272 upon axial movement of the dog clutch by a shifter fork (not shown) normally engaged in groove 285.

The inner race 272 also has a manually operated coupling member 286 secured to it at the opposite end of sleeve shaft 276. This coupling member alternately locks up the overrunning device by connecting the outer and inner races, or holds the inner race 272 stationary by connecting it to the transmission housing. For these purposes, the coupling member has a sleeve 288 slidably splined to its outer periphery, and movable axially either to the left or right as seen in FIGURE 2 by a manually operated shifter fork (not shown) engaged in groove 289. If moved to the left, the teeth 290 engage teeth 292 formed on gear member 266 to lock up the overrunning device 270 thereby providing a hill braking effect. If moved to the right, the teeth engage teeth 294 formed on the transmission housing to hold the inner race 272 stationary to effect a reverse drive, as will appear more clearly later.

In put and output shaft fluid gear pumps 294 and 296 are also provided for supplying the necessary fluid pressure in a known manner for filling of the coupling 214 and actuation of the clutch 240.

In operation of the FIGURE 2 embodiment, neutral is established by emptying coupling 214, disengaging clutch 252, and moving dog clutch 280 to the neutral position shown in FIGURE 2. Accordingly, no drive is transmitted from input shaft 210 to output shaft 212.

First or low speed forward drive is established by filling coupling 214, and moving dog clutch 280 to connect the inner race 272 of overrunning device 270 to output shaft 212. With ring gear 246 stationary, clockwise rotation of shaft 210 and impeller 224 rotates turbine 233 and sun gear 242 forwardly or clockwise rotating carrier 250 clockwise slowly. Gear 258 thus rotates gears 262 and 264 counterclockwise to rotate gear member 266 clockwise locking up overrunning device 270. Output shaft 212 is thus rotated forwardly or clockwise at a rate dependent upon the reduction through both the planetary gear set 216 and the gear train 218.

Second speed forward drive is established by emptying coupling 214 and engaging clutch 252. Accordingly, the gear set 216 is bypassed, and clockwise rotation of input shaft 210 rotates gear 258 directly at engine speed thereby rotating output shaft 212 clockwise at a faster rate than it was being rotated during establishment of low speed, the rate being determined solely by the reduction provided by the gear train 218.

Coast or hill braking may be provided in this speed range by manually moving dog coupling member 286 to lock the device 270 against overrun. A second hill braking range can be established by filling coupling 214 to condition gear set 216 for a reduction drive and cause the output shaft to drive the input shaft through both gear units.

Third speed forward or direct drive is established by simultaneously filling coupling 214 and engaging clutch 252. Clockwise rotation of input shaft 210 and impeller 224 therefore drives sun gear 242 and carrier 250 at substantially the same speed, locking up the front planetary gear set 216. Shaft 212 is therefore driven at engine speed, the inner race 272 of device 270 at this time overrunning.

Reverse drive is established by filling coupling 214, disengaging clutches 252 and 280, and moving the sleeve 288 to engage teeth 294 on the transmission housing, thereby holding the inner race 272 of overrunning device 270 stationary. Accordingly, clockwise rotation of input shaft 210 and impeller 224 rotates turbine 233 and sun gear 242 clockwise. With the ring gear 246 stationary, due to the resistance to movement of shaft 212, the carrier 250 initially attempts to rotate forwardly slowly, resulting in a forward rotational tendency of gear 258 to lockup overrunning device 270. However, since inner race 272 of the device is stationary, no rotation of the countershaft gearing is permitted, thereby preventing any forward rotational tendency of carrier 250. Consequently, carrier 250 becomes the reaction member, and forward rotation of sun gear 242 rotates ring gear 246 and output shaft 212 in a counterclockwise direction about the stationary carrier 250 at a speed depending upon the reduction of planetary gear set 216.

FIGURE 2A shows a modification of FIGURE 2 wherein the dump and fill coupling 214 of FIGURE 2 is replaced by the combination of a constantly filled coupling 314 and a fluid pressure actuated friction clutch 318. The clutch is positioned between the turbine 333 and its drive connection 343 to selectively control the transmission of torque from the turbine to the sun gear 242. In all other respects, the operations of FIGURES 2 and 2A are identical and the details therefore will not be repeated. Suffice it to say that coupling 314 is rendered operable to transmit torque in first, third and reverse drives by engagement of the clutch 318, and is rendered inoperable to transmit torque during second speed operation by the disengagement of the clutch.

From the foregoing, therefore, it will be seen that the invention provides a number of transmissions each affording three forward speed drives, neutral, a reverse drive and engine braking by the use of a minimum number of parts and a minimum number of fluid pressure controlled devices. It will thus be seen that only a simple fluid control system is required to correlate the engagement and disengagement of the two fluid pressure operated devices.

While the invention has been illustrated in its preferred embodiments, it will be clear to those skilled in the arts to which the invention pertains that many changes and modifications may be made thereto without departing from the scope of the invention.

I claim:
1. A transmission including in combination, input and output shafts, and means operably connecting said shafts for providing a plurality of forward speed drives through said transmission, said means including hydrodynamic drive means and a plurality of gear train means, said gear means including a planetary gear set and a countershaft gear type train each having a plurality of rotatable members, said drive means having a plurality of rotatable elements connecting said input shaft to said gear means in a plurality of paths, control means associated with said drive means for controlling the transmission of torque therefrom to said gear means, means operably connecting one of said elements in one of said paths to a rotatable member of each of said gear train means, means connecting another of said elements in another of said paths to another rotatable member of said planetary gear set, further means connecting a further member of said planetary gear set to said output shaft, and overrunning clutch means at times drivingly connecting a member of said countershaft gear type train to said output shaft, the control of transmission of torque from said drive means, and the engagement and disengagement of said clutch means selectively conditioning said gear means for a plurality of different drives.

2. A gear train including in combination, a plurality of selectively driven input shafts and an output shaft and gear means operably connecting said input shafts to said output shaft for providing a plurality of forward speed drives through said transmission, said gear means including a planetary gear train and a countershaft gear type train, drive means operably connecting one of said input shafts to a rotatable member of each of the said gear trains, means connecting another of said input shafts to another rotatable member of said planetary gear train, and further means connecting a further member of said planetary gear train to said output shaft, said drive means including overrunning clutch means operably connecting the said one input shaft to said countershaft type gear train, the selective drive of either of said input shafts or both concurrently providing a drive through either or both of said gear trains to provide said plurality of different drives.

3. A gear train including in combination, a plurality of selectively driven input shafts and an output shaft, and gear means operably connecting said input shafts to said output shafts for providing a plurality of forward speed drives through said transmission, said gear means including planetary gearing and countershaft gearing, drive connecting means operably connecting one of said input shafts to a rotatable member of each of said gearing, means connecting another of said input shafts to another rotatable member of said planetary gearing, and further means connecting a further member of said planetary gearing to said output shaft, said countershaft gearing including overrunning clutch means operably connecting a member of said countershaft gearing to said output shaft, the selective separate or concurrent drive of said input shafts selectively conditioning said gear means for a plurality of different drives.

4. A transmission including in combination, input and output shafts, and means operably connecting said shafts for providing a plurality of forward speed drives and a reverse drive through said transmission, said means including a fluid coupling of the fill and empty type and a plurality of gear means, said gear means including a planetary gear set having a plurality of rotatable members, and a countershaft type gear train having power input and output gears meshed with the gears of a cluster gear element mounted on a countershaft, said coupling having a rotatable pump and turbine connecting said input shaft to said gear means in a plurality of paths, means including clutch means operably connecting said pump in one of said paths to a rotatable member of the planetary gear set and to a power input gear of said gear train, means connecting said turbine to another rotatable member of said planetary gear set, further means connecting a further member of said planetary gear set to said output shaft, and connecting means including an overrunning clutch operatively connecting a power output gear meshed with said cluster of gears to said output shaft, the selective filling and emptying of said coupling and engagement of said clutches selectively conditioning said gear means for a plurality of different drives.

5. A transmission including in combination, input and output shafts, and means operably connecting said shafts for providing a plurality of forward speed drives through said transmission, said means including a fluid coupling and a plurality of gear means, said gear means including a planetary gear set having a plurality of rotatable members, and a countershaft type gear train having power input and output gears meshed with the gears of a cluster gear element mounted on a countershaft, said coupling having a rotatable pump and turbine connecting said input shaft to said gear means in a plurality of paths, clutch means operably connecting said pump in one of said path to a rotatable member of the planetary gear set and to an input gear of said gear train, clutch means connecting said turbine to another rotatable member of said planetary gear set, further means connecting a further member of said planetary gear set to said output shaft, and connecting means including an overrunning clutch operatively connecting an output gear of said gear train to said output shaft, the selective engagement of said clutches selectively conditioning said gear means for a plurality of different drives.

6. A transmission including in combination, input and output shafts, and means operably connecting said shafts for providing a plurality of forward speed drives and a reverse drive through said transmission, said means including a fluid coupling of the fill and empty type and a plurality of gear means, said gear means including a planetary gear set having a plurality of rotatable members, and a countershaft type gear train having power input and output gears meshed with the gears of a cluster gear element mounted on a countershaft, said coupling having a rotatable pump and turbine connecting said input shaft to said gear means in a plurality of paths, clutch means operably connecting said pump in one of said paths to a rotatable member of the planetary gear set and to an input gear of said gear train, means connecting said turbine to another rotatable member of said planetary gear set, further means connecting a further member of said planetary gear set to said output shaft, and connecting means including an overrunning clutch operatively connecting an output gear of said gear train to said output shaft for a forward drive, said connecting means also including a further clutch means secured to said output shaft and movable to engage a portion of said overrunning clutch, and further means to hold said overrunning clutch portion stationary in one direction of rotation when disengaged from said further clutch means to hold said gear train stationary and provide a reverse drive of said output shaft through said planetary gear set, the selective filling and emptying of said coupling and engagement of said clutch means selectively conditioning said gear means for a plurality of different drives.

7. A transmission including in combination, input and output shafts, and means operably connecting said shafts for providing a plurality of forward speed drives and a reverse drive through said transmission, said means including a fluid coupling of the fill and empty type and a plurality of gear means, said gear means including a planetary gear set having a plurality of rotatable members, and a countershaft type gear train having power input and output gears meshed with the gears of a cluster gear element mounted on a countershaft, said coupling having rotatable pump and turbine elements operably connecting said input shaft to said gear means in a plurality of paths, drive means operably connecting said turbine element in one of said paths to a rotatable member of the planetary gear set and to an input gear of said gear train, clutch means connecting said input shaft and pump element to another rotatable member of said planetary gear set, means connecting another member of said planetary gear set to said output shaft, and other clutch means including mechanical means secured to said output shaft and movable into positions to be operatively driven by alternate ones of said gear train output gears to provide a forward or reverse drive of said output shaft from said gear train, said drive means also including an overrunning clutch between said turbine element and the input gear to said gear train for at times drivingly connecting said turbine element and said input gear, the selective filling and emptying of said coupling and selective engagement of said clutches selectively conditioning said gear means for a plurality of different drives.

8. A transmission including in combination, input and output shafts, and means operably connecting said shafts for providing a plurality of forward speed drives through said transmission, said means including hydrodynamic drive means and a plurality of gear train means, said gear means including a planetary gear set and a countershaft type gear train each having a plurality of rotatable members, said planetary gear set having sun and ring and planet carrier members, said gear train having power input and output gear members meshed with cluster gear elements mounted on a countershaft, said drive means having a plurality of rotatable elements connecting said input shaft to said gear means in a plurality of paths, control means associated with said drive means for controlling the transmission of torque therefrom to said gear means, means operably connecting one of said elements in one of said paths to said sun gear and power input gear, means connecting another of said elements in another of said paths to said planet carrier, and further means connecting said ring gear to said output shaft, said means operatively connecting said one rotatable element to said power input gear including overrunning clutch means, the control of transmission of torque from said drive means, and the engagement and disengagement of said clutch means selectively conditioning said gear means for a plurality of different drives.

9. A transmission including in combination, input and output shafts, and means operably connecting said shafts for providing a plurality of forward speed drives through said transmission, said means including hydrodynamic drive means and a plurality of gear means, said gear means including a planetary gear set and a countershaft type gear train each having a plurality of rotatable members, said gear set having sun and ring gears and a planet carrier, said gear train having power input and output gears meshed with gears of a cluster gear element mounted on a countershaft, said drive means having a plurality of rotatable elements connecting said input shaft to said gear means in a plurality of paths, control means associated with said drive means for controlling the transmission of torque therefrom to said gear means, means operably connecting one of said elements in one of said paths to said planet carrier and to said input gear, means connecting another of said elements in another of said paths to said sun gear, further means connecting said ring gear to said output shaft, and overrunning clutch means at times drivingly connecting said power output gear of said gear train to said output shaft, the control of transmission of torque from said drive means, and the engagement and disengagement of said clutch means selectively conditioning said gear means for a plurality of different drives.

10. A gear train including in combination, a plurality of selectively driven input shafts and an output shaft, and gear means operably connecting said input shafts to said output shaft for providing a plurality of forward speed drives through said transmission, said gear means including planetary gearing and a countershaft type gear train, said gear set having sun and ring gears and a planet carrier, said gear train having power input and output gears meshed with gears of a cluster gear element mounted on a countershaft, drive means operatively connecting one of said input shafts to said sun gear and power input gear, means connecting another of said input shafts to said carrier, and further means connecting said ring gear to said output shaft, said drive means including overrunning clutch means connecting the said one input shaft to said power input gear, the selective drive of either of said input shafts or both concurrently providing a drive through either or both of said gear means to provide said plurality of different drives.

11. A gear train including in combination, a plurality of selectively driven input shafts and an output shaft, and gear means operably connecting said input shafts to said output shafts for providing a plurality of forward speed drives through said transmission, said gear means including planetary gearing and a countershaft type gear train, said gear set having sun and ring gears and a planet carrier, said gear train having power input and output gears meshed with gears of a cluster gear element mounted on a countershaft, drive connecting means operably connecting one of said input shaft to said carrier and said power input gear, means connecting another of said input shafts to said sun gear, and further means connecting said ring gear to said output shaft, said gear train including overrunning clutch means operative at times to connect said power output gear to said output shaft, the selective separate or concurrent drive of said input shafts selectively conditioning said gear means for a plurality of different drives.

12. A transmission including in combination, input and output shafts, and means operably connecting said shafts for providing a plurality of forward speed drives and a reverse drive through said transmission, said means including a fluid coupling and a plurality of gear means, said gear means including a planetary gear set having a plurality of rotatable members, and a countershaft type gear train having power input and output gears meshed with the gears of a cluster gear element mounted on a countershaft, said coupling having a rotatable pump and turbine connecting said input shaft to said gear means in a plurality of paths, clutch means operably connecting said pump in one of said paths to a rotatable member of the planetary gears set and to an input gear of said gear train, means connecting said turbine to another rotatable member of said planetary gear set, further means connecting a further member of said planetary gear set to said output shaft, and connecting means including an overrunning clutch operatively connecting an output gear of said gear train to said output shaft for a forward drive, said connecting means also including a further clutch means secured to said output shaft and movable to engage a portion of said overrunning clutch, and further means to hold said overrunning clutch portion stationary in one direction of rotation when disengaged from said further clutch means to hold said gear train stationary and provide a reverse drive of said output shaft through said planetary gear set, the selective engagement of said clutch means selectively conditioning said gear means for a plurality of different drives.

13. A transmission including in combination, power input and output shafts, and means operably connecting said shafts for providing a plurality of forward speed drives and a reverse drive through said transmission, said means including a hydrodynamic drive device and a plurality of gear means, said gear means including a planetary gear set having a plurality of rotatable members including sun and ring gears and a planet carrier, and a countershaft type gear train having power input and output gears meshed with the gears of a cluster gear element mounted on a countershaft, said drive device having rotatable pump and turbine members connecting said input shaft to said gear means in a plurality of paths, clutch means operably connecting said pump in one of said paths to said carrier and to said power input gear, means operably connecting said turbine to said sun gear, further means connecting said ring gear to said output shaft, and connecting means including an overrunning clutch operatively connecting a power output gear to said output shaft for a forward drive, said connecting means also including a mechanical clutch means secured to said output shaft and movable to engage a portion of said overrunning clutch, and further means to hold said overrunning clutch portion stationary in one direction of rotation when disengaged from said mechanical clutch to hold said gear train gears stationary and provide a reverse drive of said output shaft through said planetary gear set, the selective engagement of said clutches selectively conditioning said gear means for a plurality of different drives.

14. A transmission including in combination, power input and output shafts, and means connecting said shafts for providing a plurality of forward speed drives and a reverse drive through said transmission, said means including a fluid coupling and a plurality of gear means, said gear means including a planetary gear set having a plurality of rotatable members including sun and ring gears and a planet carrier, and a countershaft type gear train having power input and output gears meshed with the gears of a cluster gear element mounted on a countershaft, said coupling having rotatable pump and turbine elements connecting said input shaft to said gear means in a plurality of paths, drive means operably connecting said turbine element in one of said paths to said sun gear and to said power input gear, clutch means connecting said input shaft and pump element to said carrier, means connecting said ring gear to said output shaft, said power output gears rotating in opposite directions, and other clutch means including mechanical coupling means secured to said output shaft and movable into positions to be operatively driven by alternate ones of said power output gears to provide a forward or reverse drive of said output shaft from said gear train, said drive means also including an overrunning clutch between said turbine element and the power input gear at times drivingly connecting said turbine element and said input gear, the selective engagement of said clutch means selectively conditioning said gear means for a plurality of different drives.

References Cited by the Examiner

UNITED STATES PATENTS

| | | | |
|---|---|---|---|
| 2,284,123 | 5/1942 | Breer et al. | 74—718 X |
| 2,524,975 | 10/1950 | Hobbs | 74—740 |
| 2,602,353 | 7/1952 | Keller | 74—677 |
| 2,605,650 | 8/1952 | Winther et al. | 74—740 |
| 2,968,197 | 1/1961 | De Lorean | 74—688 |
| 2,985,036 | 5/1961 | Forster | 74—240 |

DAVID J. WILLIAMOWSKY, *Primary Examiner.*
DON A. WAITE, *Examiner.*
R. D. GRAUER, T. C. PERRY, *Assistant Examiners.*